US006413403B1

United States Patent
Lindquist et al.

(10) Patent No.: US 6,413,403 B1
(45) Date of Patent: *Jul. 2, 2002

(54) METHOD AND APPARATUS EMPLOYING PAD DESIGNS AND STRUCTURES WITH IMPROVED FLUID DISTRIBUTION

(75) Inventors: Paul Lindquist, Eagle, ID (US); Bulent Basol, Manhattan Beach, CA (US); Cyprian Uzoh, Milpitas, CA (US); Homayoun Talieh, San Jose, CA (US)

(73) Assignee: NuTool Inc., Milpitas, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 09/621,969

(22) Filed: Jul. 21, 2000

Related U.S. Application Data (63) Continuation-in-part of application No. 04/511,278, filed on Feb. 23, 2000.

(51) Int. Cl.[7] ............... C25D 5/00; C25D 5/02; C25D 17/00; C25F 3/00; C25F 7/00
(52) U.S. Cl. .............. 205/97; 205/118; 205/672; 204/224 R; 204/224 M
(58) Field of Search ................ 205/98, 118, 668, 205/96, 97; 204/224 R, 224 M (56) References Cited

U.S. PATENT DOCUMENTS

| | | | |
|---|---|---|---|
| 3,328,273 A | 6/1967 | Cruetz et al. | 205/298 |
| 4,430,173 A | 2/1984 | Boudot et al. | 205/296 |
| 4,948,474 A | 8/1990 | Miljkovic | 205/297 |
| 4,954,142 A | 9/1990 | Carr et al. | 51/309 |
| 4,975,159 A | 12/1990 | Dahms | 205/125 |
| 5,084,071 A | 1/1992 | Nenadic et al. | 51/309 |
| 5,252,565 A | 10/1993 | Bernhardt et al. | 437/228 |
| 5,354,490 A | 10/1994 | Yu et al. | 252/79.1 |
| 5,516,412 A | 5/1996 | Andricacos et al. | 252/79.1 |

(List continued on next page.)

FOREIGN PATENT DOCUMENTS

| | | |
|---|---|---|
| WO | 98/27585 | 6/1998 |
| WO | 00/26443 | 5/2000 |

OTHER PUBLICATIONS

James J. Kelly et al., "Leveling and Microstructural Effects of Additives for Copper Electrodeposition", Journal of the Electrochemical Society, 146 (7), 1999, pp. 2540–2545. Month Not Available; Manuscript Rec3 d Oct. 7, 1998.

Joseph M. Steigerwald et al., "Chemical Mechanical Planarization of Microelectronic Materials", A Wiley–Interscience Publication, 1997, by John Wiley & Sons, Inc. pp. 212–222 month not available.

Robert D. Mikkola et al., "Investigation of the Roles of the Additive Components for Second Generation Copper Electroplating Chemistries Used for Advanced Interconnect Metalization", 2000 IEEE, IEEE Electron Devices Society, pp. 117–119 Jun. 2000.

Primary Examiner—Donald R. Valentine
Assistant Examiner—Erica Smith-Hicks
(74) Attorney, Agent, or Firm—Crowell & Moring, LLP (57) ABSTRACT

An apparatus capable of assisting in controlling an electrolyte flow and distribution of an electric field, a magnetic field, or an electromagnetic field in order to process a substrate is provided with improved fluid distribution. A support member having a top surface and a bottom surface contains at least one support member electrolyte channel. Each support member electrolyte channel forms a passage between the top surface and the bottom surface and allows the electrolyte to flow therethrough. A pad is attachable to the support member and contains at least one set of pad electrolyte channels also allowing for electrolyte flow therethrough to the substrate. Each support member electrolyte channel is connected to one set of pad electrolyte channels by fluid distribution structure. A method of assisting in control of the electrolyte flow and distribution of the electric field, the magnetic field, or the electromagnetic field, utilizing the apparatus, is also provided.

22 Claims, 9 Drawing Sheets

U.S. PATENT DOCUMENTS

| | | | |
|---|---|---|---|
| 5,543,032 A | 8/1996 | Datta et al. | 205/670 |
| 5,681,215 A | 10/1997 | Sherwood et al. | 451/388 |
| 5,755,859 A | 5/1998 | Brusic et al. | 336/200 |
| 5,762,544 A | 6/1998 | Zuniga et al. | 451/285 |
| 5,770,095 A | 6/1998 | Sasaki et al. | 216/38 |
| 5,773,364 A | 6/1998 | Farkas et al. | 438/692 |
| 5,793,272 A | 8/1998 | Burghartz et al. | 336/200 |
| 5,795,215 A | 8/1998 | Guthrie et al. | 451/286 |
| 5,807,165 A | 9/1998 | Uzoh et al. | 451/41 |
| 5,840,629 A | 11/1998 | Carpio | 438/692 |
| 5,858,813 A | 1/1999 | Scherber et al. | 438/693 |
| 5,884,990 A | 3/1999 | Burghartz et al. | 336/200 |
| 5,897,375 A | 4/1999 | Watts et al. | 438/693 |
| 5,911,619 A | 6/1999 | Uzoh et al. | 451/5 |
| 5,922,091 A | 7/1999 | Tsai et al. | 204/224 R |
| 5,930,669 A | 7/1999 | Uzoh | 438/627 |
| 5,933,753 A | 8/1999 | Simon et al. | 438/629 |
| 5,954,997 A | 9/1999 | Kaufman et al. | 51/306 |
| 5,985,123 A | 11/1999 | Koon | 205/96 |
| 6,004,880 A | 12/1999 | Liu et al. | 438/692 |
| 6,027,631 A | 2/2000 | Broadbent | 205/137 |
| 6,063,506 A | 5/2000 | Andricacos et al. | 428/546 |
| 6,066,030 A * | 5/2000 | Uzoh | 451/41 |
| 6,071,388 A | 6/2000 | Uzoh | 204/242 |
| 6,074,544 A | 6/2000 | Reid et al. | 205/157 |
| 6,103,085 A | 8/2000 | Woo et al. | 205/143 |
| 6,132,587 A | 10/2000 | Jorne et al. | 205/123 |
| 6,136,163 A | 10/2000 | Cheung et al. | 204/198 |
| 6,176,992 B1 | 1/2001 | Talieh | 205/87 |

* cited by examiner

METHOD AND APPARATUS EMPLOYING PAD DESIGNS AND STRUCTURES WITH IMPROVED FLUID DISTRIBUTION

This application is a continuation-in-part of pending U.S. patent application Ser. No. 09/511,278, filed Feb. 23, 2000, titled PAD DESIGNS AND STRUCTURES FOR A VERSATILE MATERIALS PROCESSING APPARATUS, the entire disclosure of which is expressly incorporated herein by reference.

BACKGROUND OF THE INVENTION

1. Field of the Invention

The present invention relates to methods and structures by which improved distribution of chemical solutions, such as plating solutions, etching solutions, or electroetching solutions, is provided to a pad/substrate interface in a plating or etching apparatus that uses an anode/pad assembly. According to the invention, a system of channels is designed under the pad to distribute the solution more evenly and to prevent the solution from coming directly from the pad support member and hitting the substrate surface.

2. Description of Related Art

There are numerous processing steps in the fabrication of high performance integrated circuits (ICs), packages, magnetic film heads, thin film display units, and the like. One important step is to deposit, remove, or planarize a conductive or insulative material on a work piece, such as a semiconductor substrate, or perform various combinations of such depositing, removing and planarizing operations. Deposition of conductive materials such as copper, gold, nickel, rhodium, platinum, magnetic materials, and their various alloys may be performed, for example, by electrodeposition.

Figure 1A:
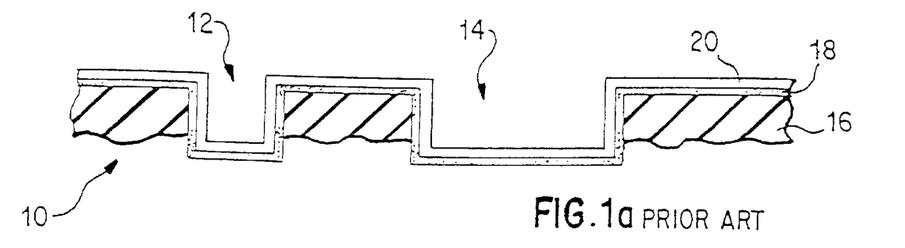
FIG. 1a is a partial cross-sectional view of a substrate having various material layers disposed thereon.

In inlaid metal technology, a workpiece, such as a substrate 10 shown in FIG. 1a, may consist of various topographical features such as channels 14 and vias 12 etched in a suitable dielectric material 16. The surface of the etched dielectric material 16 is generally coated with a suitable adhesion/barrier film layer 18. Over the barrier layer 18, a suitable plating base layer 20, often called a "seed layer", is deposited. A conductive layer 22 is then applied over the plating base layer to fill, and preferably over-fill, the vias 12 and channels 14 etched in the dielectric material 16 as shown in FIG. 1c.

Figure 1B:
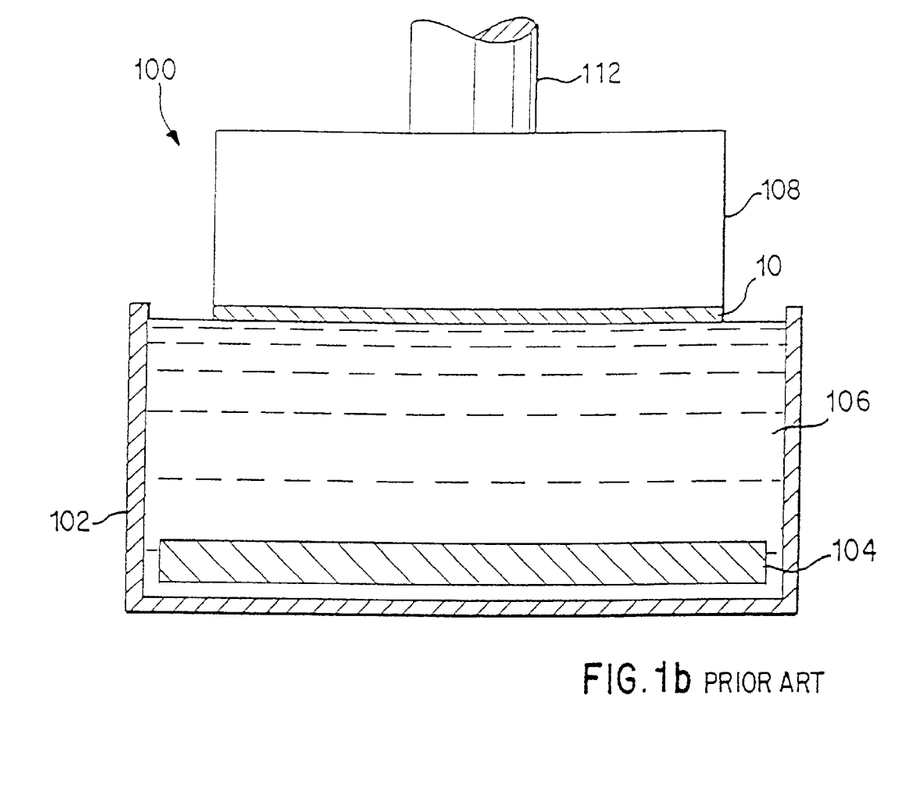
FIG. 1b is a simplified illustration of a conventional deposition chamber for depositing a conductive material on a substrate.
Figure 1C:
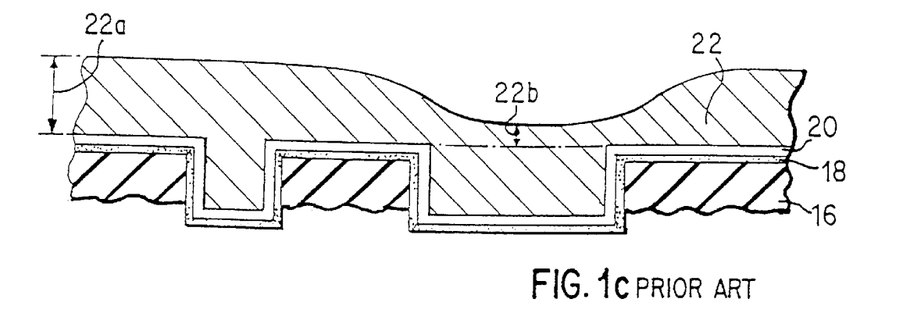
FIG. 1c is a partial cross-sectional view illustrating a variation in material overburden across the substrate after material deposition.

The conductive material may be, for example, Cu deposited by way of a chamber-type device 100 (generally shown in FIG. 1b). The chamber device 100 includes a deposition chamber 102, which contains an anode 104 and electrolyte 106. The anode 104 may be attached to the bottom of the chamber 102.

A holder 108 holds the workpiece, such as the substrate 10. For a detailed description of the holder, reference can be made to the assignee's co-pending application Ser. No. 09/472,523, entitled "Work Piece Carrier Head For Plating and Polishing" filed Dec. 27, 1999, the specification of which is incorporated by reference herein as non-essential matter.

For the deposition process, the substrate 10 is typically immersed in the electrolyte 106 with the aid of the holder 108, which also provides a way of electrically contacting the substrate 10. By applying a potential difference between the anode 104 and the substrate 10 (i.e., the cathode), materials may be deposited on or removed from the substrate. For example, when the anode is more positive than the substrate, copper may be deposited on the substrate 10. If the anode is more negative than the substrate, however, copper may be etched or removed from the substrate. To aid electrolyte agitation and enhance mass transfer, the substrate holder 108 may include a rotatable shaft 112 such that the substrate holder 108 and the substrate 10 can be rotated. The substrate 10 is typically spaced apart from the anode 104 at a distance of at least about 10 mm; this distance may, however, be as great as about 300 mm. The surface of the substrate 10 may contain topographic features, such as the vias 12 and channels 14 illustrated in FIG. 1a. After performing material deposition to fill the various features/cavities using electrolyte containing leveling additives, a variation in the thickness of the deposited conductive material 22 inevitably occurs over the surface of the substrate. The undesirable excess conductive material over the field region is called "overburden". This variation in thickness or "overburden" is shown in FIG. 1c with reference to portions 22a and 22b.

Figure 2A:
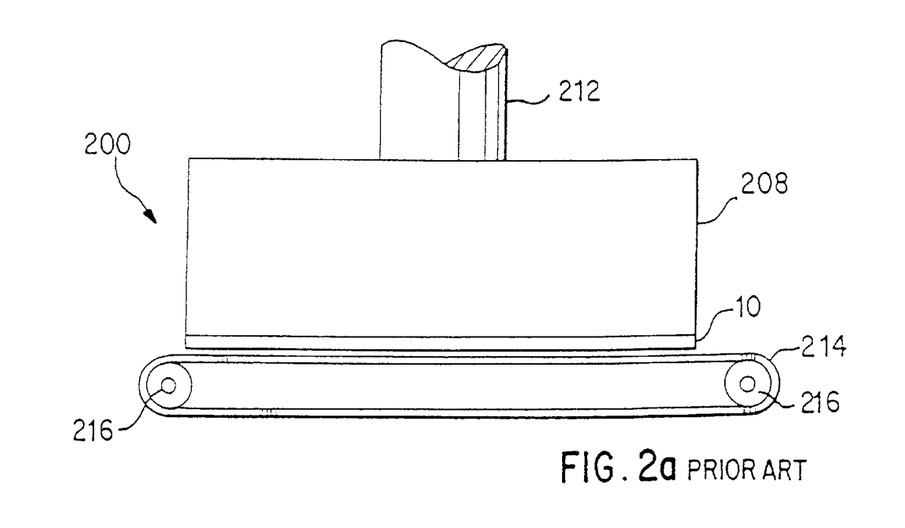
FIG. 2a is a simplified illustration of a conventional CMP apparatus for polishing a substrate surface.
Figure 2B:
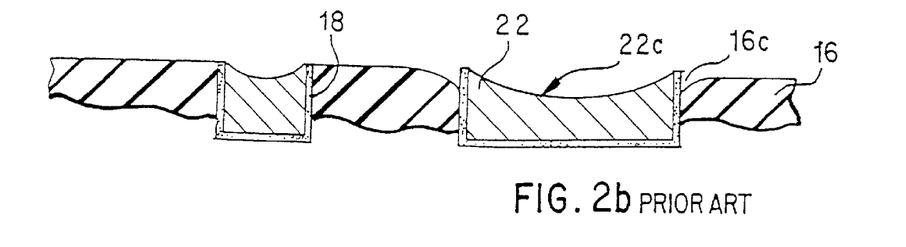
FIG. 2b is a partial cross-sectional view of a substrate after the conventional CMP process.

After depositing the conductive material 22 on the top surface of the substrate 10, the substrate 10 is typically transferred to a chemical mechanical polishing (CMP) apparatus in order to polish, planarize, or both polish and planarize the same surface. FIG. 2a illustrates one possible version of a conventional CMP apparatus 200 used to polish/planarize the substrate 10 and/or electrically isolate the deposited conductive material within the particular features located thereon. The substrate holder 208, which may be similar to the holder 108 described above, holds and positions the substrate 10 in close proximity to a belt-shaped CMP pad 214. The belt-shaped pad 214 is adapted to rotate in an endless loop fashion about rollers 216. The polishing/planarizing process occurs when the rollers 216 rotate and the pad 214 is moved with a circular motion while making contact with the surface of the substrate 10. A conventional slurry may also be applied to the pad 214 while the substrate 10 is being polished. The substrate surface after polishing is shown in FIG. 2b.

The conventional method for depositing a conductive material produces large variations in material overburden across the substrate as shown in FIG. 1c. The conventional CMP of this large overburden causes defects on the substrate 10 such as dishing 22c and dielectric erosion 16c also shown in FIG. 2b. It also is responsible for low substrate processing throughput, which is a major source of manufacturing yield loss.

SUMMARY OF THE INVENTION

There is therefore a need for an apparatus that can reduce the time needed during the planarization phase of the fabrication process, and that can simplify the planarization phase itself. In other words, a more efficient and effective method and apparatus for depositing a conductive material on a substrate is needed. Several improved pad designs and structures are disclosed herein that can be used for depositing conductive material with a very uniform material overburden on a surface of a substrate. The pad design may also be used in a polishing technique such as CMP.

It is an object of the present invention to provide an improved method and an improved apparatus for performing any of depositing, removing, polishing, and/or modifying operations on conductive material, which is to be applied to or has been applied on a substrate. The improved method eliminates direct communication of electrolyte fluid flow from a pad support member to the substrate surface and permits electrolyte fluid to be supplied at greater pressures and flow rates.

This and other objects of the present invention are obtained by a particular apparatus which is capable of assisting in controlling an electrolyte flow and distribution of an electric field, a magnetic field, or an electromagnetic field in order to process a substrate. The apparatus includes a support member having a top surface and a bottom surface, the support member containing at least one support member electrolyte channel. Each support member electrolyte channel forms a passage between the top surface and the bottom surface of the support member and allows the electrolyte to flow therethrough. The apparatus also includes a pad, attachable to the support member, which contains at least one set of pad electrolyte channels also allowing for electrolyte flow therethrough to the substrate. Each support member electrolyte channel is connected to one set of pad electrolyte channels by a particular fluid distribution structure.

According to one embodiment of the invention, each support member electrolyte channel is one of a plurality of support member electrolyte channels, and each set of pad electrolyte channels is one of a plurality of sets of pad electrolyte channels.

The fluid distribution structure includes distribution channels interconnecting each support member electrolyte channel to a set of pad electrolyte channels. In one embodiment, the distribution channels are formed in the pad, while in another embodiment, the distribution channels are recessed channels defined in a surface of the pad facing a top surface of the support member.

One preferred embodiment is constructed so as to have an element interposed between the support member and the pad in which the fluid distribution structure is defined. In this case, the element is a platen having channels defined therein. The channels defined in the platen interconnect each support member electrolyte channel to the one set of pad electrolyte channels. No support member electrolyte channel is aligned with any of the pad electrolyte channels in any of the preferred embodiments.

In the preferred embodiments, each of the distribution channels extends substantially horizontally between the at least one support member electrolyte channel and one pad electrolyte channel of the set of pad electrolyte channels.

An improved method of assisting in control of an electrolyte flow and distribution of an electric field, a magnetic field, or an electromagnetic field for processing a substrate is also provided.

Other objects, advantages and novel features of the present invention will become apparent from the following detailed description of the invention when considered in conjunction with the accompanying drawings.

BRIEF DESCRIPTION OF THE DRAWINGS

FIG. 3b is an enlarged view of the anode component of the apparatus shown in FIG. 3a;

DETAILED DESCRIPTION OF THE PREFERRED EMBODIMENTS

The present invention will now be described in detail. Various refinements in and modifications of the various embodiments are possible based on the principles and teachings herein.

The present invention can be used to deposit and/or remove materials on any substrate, such as a wafer, flat panel, magnetic film head, integrated circuit, package, semiconductor device or chip, or any other device or workpiece of interest. For purposes of this description, the terms "substrate" and "workpiece" can be used interchangeably. Further, the specific parameters referred to herein, such as materials, dimensions, thicknesses, and the like, are intended to be explanatory rather than limiting.

Figure 3A:
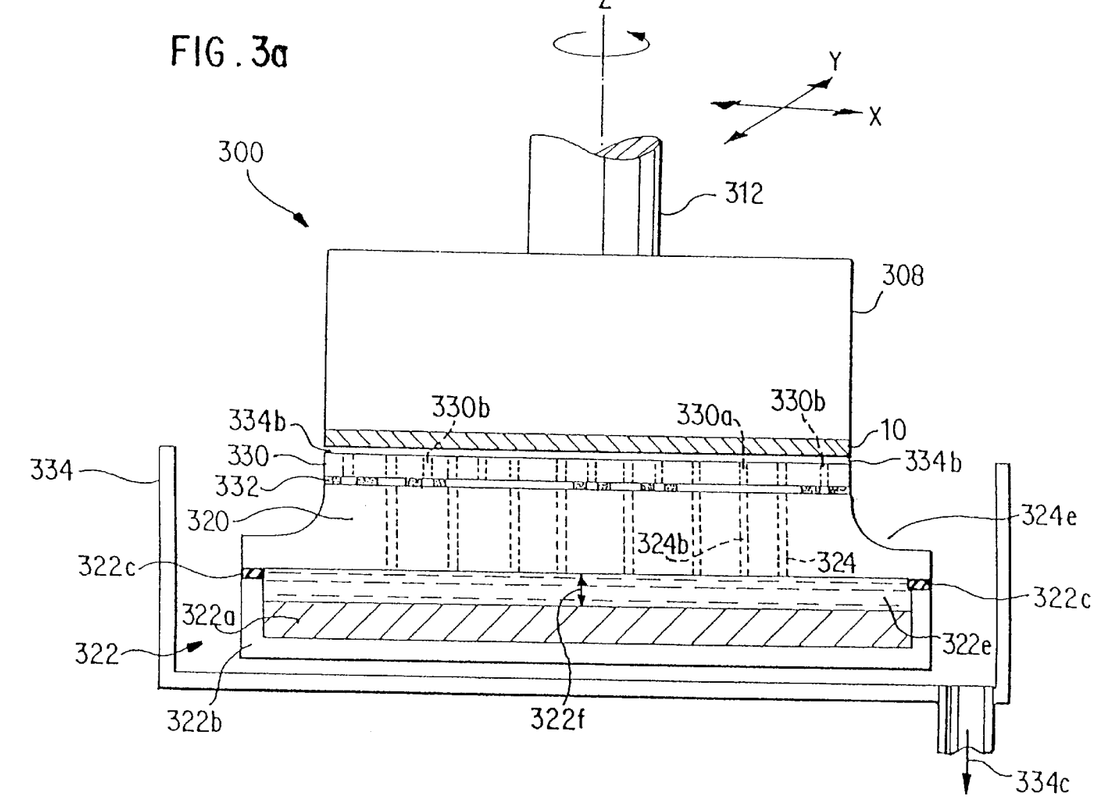
FIG. 3a illustrates one example of an overall apparatus which could be modified to incorporate support member, pad, and fluid distribution structure according to the present invention.

FIG. 3a illustrates an apparatus 300 in accordance with a first example in which the improved support member, pad, and fluid distribution structure of the present invention can be incorporated. A substrate holder 308 having a rotatable shaft 312 holds and positions the substrate 10. The substrate holder 308 can move up, down, and about the z-axis, as well as translate along the x- or y-axes. It has the ability to control the pressure at which the substrate 10 is pushed against a pad 330. Both deposition and removal steps are performed using the apparatus illustrated in FIG. 3a. For further details on this overall apparatus for performing both deposition and removal steps, reference can be made to assignee's co-pending U.S. application Ser. No. 09/201,929, filed Dec. 1, 1998 and titled "Method and Apparatus for Electrochemical Mechanical Deposition", the specification of which is incorporated by reference herein as non-essential matter.

In FIG. 3a, an anode component, generally indicated at 322, includes a bottom portion 322a, which may be a soluble or inert anode material, attached to an anode holder or housing 322b by known methods. A stiff upper pad support member 320 is attached or secured to the anode holder 322b. Electrically isolating the anode holder 322b from the stiff pad support member 320 is an insulating spacer 322c.

The pad support member 320 is secured to the anode holder 322b with screws in a manner such that they are both electrically isolated from one another. An electrolyte or solution chamber 322e is therefore formed between anode bottom portion 322a and the pad support member 320. The gap 322f separates the anode bottom portion 322a from the pad support member 320. Small channels 324 are formed in the pad support member 320 for fluid solutions to communicate between the chamber 322e to the substrate 10. A polishing pad material 330 is attached above the pad support member 320. The polishing pad material 330 may contain two or more distinct types of channels. Channels 330a are provided for the fluids to communicate between the chamber 322e and the substrate 10, and channels 330b are provided for mostly an electric field to communicate between the anode bottom portion 322a, via the electrolyte chamber 322e and pad support member 320, and the substrate 10. The combination of channels (sometimes referred to as holes) is used to manipulate the electrolyte fluid flow and electric field distribution over the substrate 10 to control the nature of the material deposited on the substrate, in particular the uniformity of the deposit on the substrate.

The pad material 330 is secured to the pad support member 320 with the aid of a fastener, such as an adhesive material 332. The entire anode bottom portion-pad support member-pad assembly 322 is housed in another chamber 334, in which electrolytes emanating from interface 334b between the substrate 10 and a surface of the pad material 330 accumulate. This accumulated electrolyte solution may be pumped into a reservoir system for reclaimation and reuse, or may just simply be discarded.

It is further noted that electrical contact with the anode bottom portion 322a may occur directly or via the anode housing 322b, while another electrical contact of opposite polarity is made to the substrate 10. Thus, electrical contact need not be made to the pad support member 320.

By way of example, the anode housing 322b may be formed of polymeric material such as PVDP, polypropylene, PTFE, and/or other materials that are essentially inert to the electrolyte fluids used in the reaction. However, it is most preferred that the anode housing 322b be made of titanium, stainless steel, graphite, and the like. The anode housing may also be coated with a very thin layer of platinum or palladium. The anode material itself may be an inert type of anode such as graphite, platinized metals, such as Pt/Ti, and the like. In some inert anode applications, for simplification, the inner wall of the anode housing 322b may serve as the anode.

In other applications, a soluble anode 322a may be housed in the anode housing 322b. Copending and commonly assigned U.S. application Ser. No. 09/568,584, titled ANODE ASSEMBLY FOR PLATING AND PLANARIZING A CONDUCTIVE LAYER, filed May 11, 2000, discloses the use of a soluble or consumable anode. The soluble anode 322a may be formed by materials such as Cu, phosphorized Cu, Ni, gold, Pt, Ag, Cd, Rh and/or various other alloy electrode materials depending upon the material to be plated. The insulating sealing spacer 322c may be made of a polymeric material or a combination of polymeric/metallic and/or polymeric/ceramic materials. It is only essential that the electrolyte or fluids used in the reaction do not degrade the spacer 322c, and/or that the spacer 322c does not adversely affect the designed qualities of the metal deposited on the substrate 10. Additionally, the method of securing the pad support member 320 via the insulating spacer 322c must not electrically short the anode 322a to the pad support member 320.

The pad support member 320 is preferably fabricated from a stiff material with a very specific modulus, such as carbon, titanium and the like. Stainless steel may also be used. The pad support member material must not interact in an adverse manner with the deposition fluids so as to affect the material deposited on the substrate. The thickness of the pad support member 320 is such that the member behaves as if it has an infinite stiffness relative to itself (weight) and with respect to the applied polishing load. Additionally, the pad support member 320 may be coated with a very thin layer of platinum or palladium, e.g. about up to 500 Å, to enhance the adhesion of the pad material 330 and also to enhance the electric field dispersion.

The anode housing 322b of FIG. 3a has at least one channel for fluid entry (not shown) such that the electrolyte fluid can fill the chamber 322e formed by the gap 322f. The electrolytes then pass through the small channels or holes 324, 324b in the pad support member 320 and through the channels or holes 330a in the pad material 330 to a surface of the substrate 10. The fluid exits the substrate surface as indicated at 334b and returns to the bottom of the outer chamber housing 334, where it is drained via drain opening 334c.

Referring back to the channels or holes formed in the pad material 330, more than one type of channel/hole with respect to the pad support member 320 or the anode 322a may be provided. For example, a first family of channels 330a (or holes, cavities, etc.) can be designed and positioned for fluid and electric field transfer from the electrolyte chamber 322e to the substrate. Hence, the channels 330a may be disposed directly on, or adjacent to, channels 324b formed in the pad support member 320 as shown in FIG. 3a. Another family of holes or channels 330b is positioned, with respect to the pad support member 320 (e.g., with the aid of the adhesive sheet 332), such that the electric field predominately communicates from the anode chamber 322e to the substrate 10 through these channels. Other channels may also be designed into the pad material 330 to enhance fluid shearing, mass transfer, and the like, at the substrate surface.

Figure 3B:
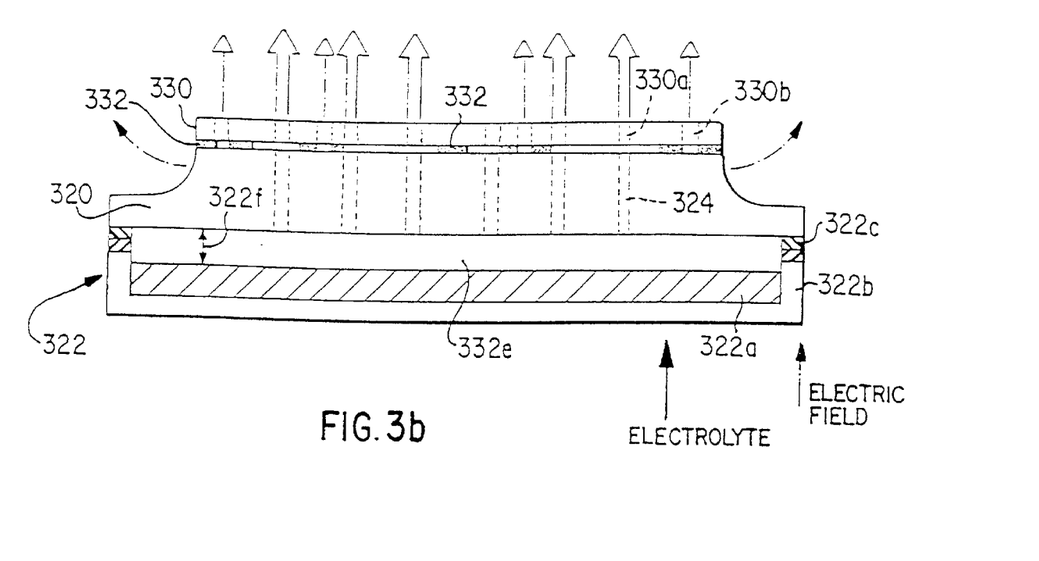

FIG. 3b is an enlarged view of the anode component of FIG. 3a showing a configuration of channels in the pad material 330. Here, the broken arrows indicate channels 330b designed for mostly electric field communication, while the solid arrows indicate channels 330a designed for mostly fluid communication. Thus, as shown by the solid/broken arrows, portions of the channels in the pad material 320 allow both the fluid and the electric field to communicate from the anode chamber 332e to the substrate. Other portions of the pad material predominantly allow the electric field to communicate as opposed to the electrolyte fluid.

Combination of these families of channels 330a, 330b and placement of adhesive sheets 332 are used to control electrolyte and electric field distribution on the substrate 10, and thus control the nature of the material deposited. More particularly, the uniformity of the deposited material can be controlled during plating or plating/polishing operations.

In FIGS. 3a and 3b, the anode-pad support member-pad material is depicted as being stationary. In fact, the combined unit may rotate and also translate in both lateral directions, similar to that of the substrate holder 308.

Referring back to the channels 324 arranged in the pad support member 320 and the channels 330a and 330b in the pad material 330, these channels may have any shape, such as square, rectangular, etc.; however, it is preferred that they be cylindrical in shape. The diameter of the channels may range from about 0.01 to 8 mm, preferably between about 0.03 to 6 mm.

The number of channels in the pad support member 320 may range between about 1 to at least 1000, but preferably is between about 10 to 800, depending on the dimensions of the pad support member. These channels may be distributed across the lateral dimensions of the pad support member in any profile that enhances fluid and electric field transfer through the channels. For instance, the channels may be spaced apart by about 0.5 to 50 mm, but preferably between about 1 to 20 mm. Also, the channels need not all be uniform, but may have varying dimensions and diameters.

The channels 330a and 330b in the pad material 330 may be similar to those on the pad support member 320. However, channels 330b are positioned in the pad material 330 so as to land on the pad support member away from channels 324, or at least separated from channels 324 via an insulating or adhesive sheet material 332x (see FIG. 3c). As a result, fluids passing through channels 324 cannot communicate directly with channels 330b. In this manner, the electrolytes flowing in channels 330a originate directly from channels 324 in the pad support member, while any fluids in channels 330b emanate from the fluids discharged from the channels 330a. Besides the channels in the pad material, the dimensions of the pad material, e.g. the pad diameter, may also be smaller than that of the substrate.

Figure 3C:
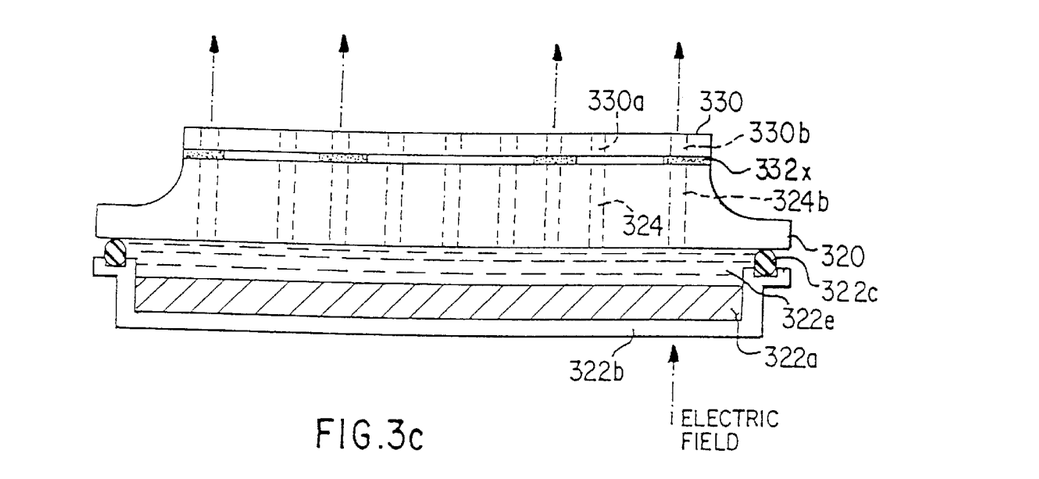
FIG. 3c illustrates another embodiment of an anode component using a non-conducting, non-porous adhesive material.
Figure 3D:
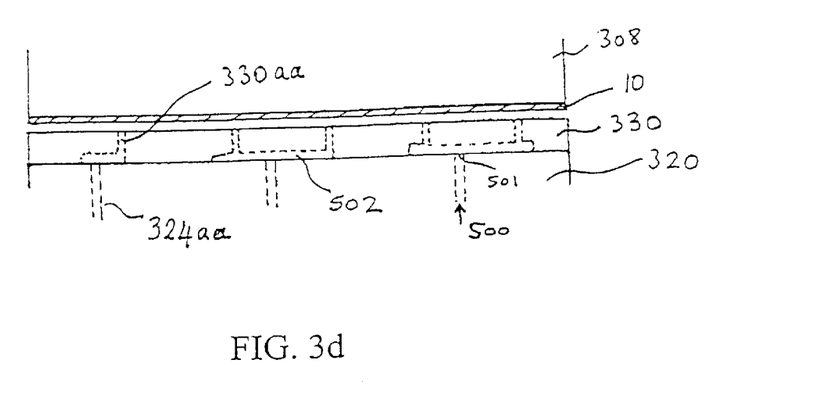
FIG. 3d is a side view of a first embodiment of an apparatus including the improved fluid distribution structure according to the invention.

FIG. 3d shows the improved construction of the pad support member 320, the pad 330 and the substrate holder 308 supporting the substrate 10 according to the invention. Holes or electrolyte channels 324aa in the pad support member 320 carry the electrolyte solution 500 to points 501 on the top surface plane of the pad support member 320. The solution 500 then passes into the horizontal distribution channels 502 and gets distributed to various pad electrolyte holes or channels 330aa in the pad 330. Through the pad holes 330aa, the solution 500 is delivered to the area between the top surface of the pad 330 and the bottom surface of the substrate 10.

Figure 3E:
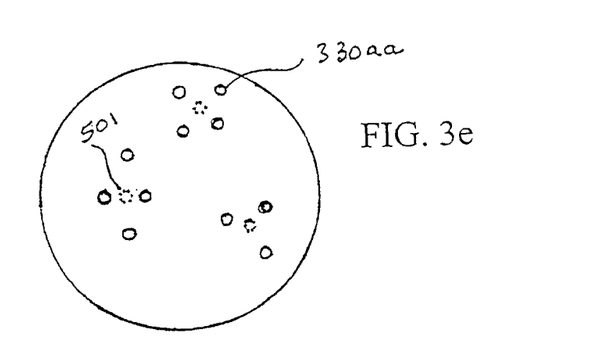
FIG. 3e is a top view of the pad shown in FIG. 3d showing three sets of pad channels.
Figure 3F:
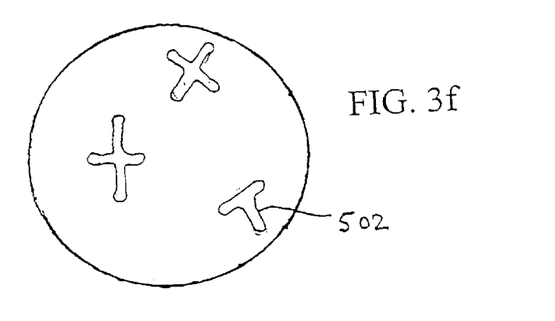
FIG. 3f is a bottom view of the pad shown in FIG. 3d which shows horizontal channels in the pad defining fluid distribution structure.

FIGS. 3e and 3f show, respectively, the top view and the bottom view of the pad 330. From the top, only the pad electrolyte channels 330aa are visible. The dotted circles indicate the positions of the points 501 where the channels 324aa in the pad support member 320 terminate. The bottom view of FIG. 3f shows that the solution 500, delivered to points 501 by the holes 324aa, is carried by horizontal channels 502 to the pad holes 330aa. This design avoids the alignment of the pad holes 330aa and the holes 324aa in the pad support member 320, and distributes solution more evenly to the various pad holes 330aa.

Figure 3G:
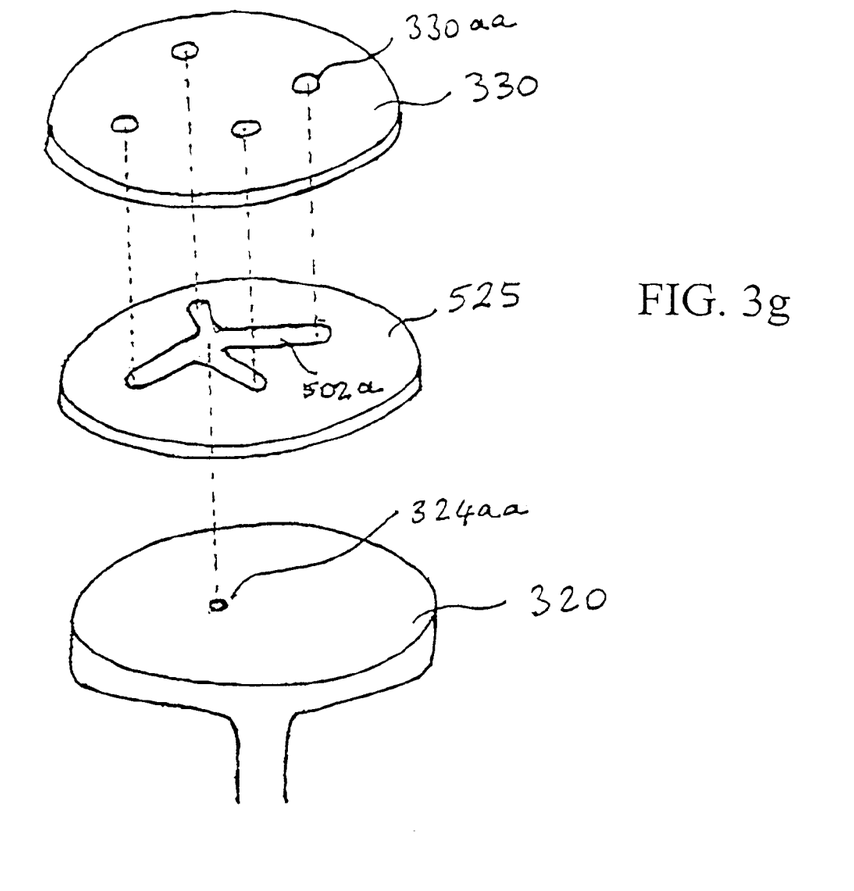
FIG. 3g is an exploded view of a second embodiment according to the invention with the fluid distribution structure formed in a platen interposed between the pad and its support member.

FIGS. 3d–3f show the horizontal channels 502 as disposed in the back of the pad, within its structure. There are other approaches of achieving the same result. For example, the horizontal channels 502 may be machined or carved into the top surface of the pad support member 320. In this case, the new channels would be a mirror image with respect to the plane defined by the interface between the pad 330 and the pad support member 320, and the pad 330 would have only the pad holes 330aa in it. Of course, horizontal channels could be formed in both the bottom of the pad 330 and the top of the pad support member 320. FIG. 3g shows an alternative assembly that includes the pad 330, a channel platen 525, and the pad support member 320. The pad 330 has only pad holes 330aa. Horizontal distribution channels 502a are cut into the channel platen, which is formed as a separate piece. The pad 330 is mounted on the channel platen 525 in a way that matches the channels 502a with the positions of the pad holes 330aa. The pad/channel platen assembly is then mounted on the pad support member 320 in a way that matches the position of the hole 324aa carrying the solution with the channels.

Numerous materials can be used for fabrication of the channel platen. Polycarbonate and other polymeric materials that are stable in the solution used can be employed. The pad can be mounted on the channel platen using adhesives, which are not specifically shown in any of FIGS. 3d–3g. Similarly, the channel platen can be mounted on the top surface of the pad support member through adhesives that are chemically and mechanically stable in the solution. There can be multiple other platens between the channel platen 525 and the pad 330 with appropriate hole/channel designs to lead the solution from the holes 324aa to the pad holes 330aa.

During operation, for example Cu plating, the Cu plating solution comes through the holes in the pad support member, passes into the horizontal channels and gets distributed to the pad holes. The solution then reaches the substrate surface and flows between the substrate surface and the pad surface before getting discharged from the top edge of the pad.

Although the invention has been described in connection with round substrates and pads, it is also applicable to substrates and pads of other shapes. Also, although the examples schematically show round holes in the pads, the holes can actually be of any shape. The thickness of the channel platen can be as small as 0.5 mm and as large as 8 mm; typically, this thickness is 2–3 mm. The width of the channels can be adjusted depending upon the flow rate of the solution. Typically, these channels can be as wide as the holes in the pad or as small as about 1 mm. The channels can be machined into the back of the pad itself as in FIG. 3d, or they can be machined in a separate channel platen as shown in FIG. 3g. The channels can also be partly or completely machined into the top surface of the pad support member 320. Machining can be done by milling, blade cutting, water jet cutting, laser cutting and other techniques commonly used in the field.

It is to be understood that the support member electrolyte channel, distribution channel and pad electrolyte channel combinations of this invention are designed to take the place of (a) the electrolyte channels 324, 324b in the support member 320 of FIGS. 3a–3c, and (b) corresponding channels 330a provided for electrolyte fluid communication in the pad material in the same FIGS. 3a–3c. In the construction shown in FIGS. 3d–3g, moreover, an additional family of channels (not shown) may be incorporated into the pad 330 to provide for predominately electric field communication.

Figure 4A:
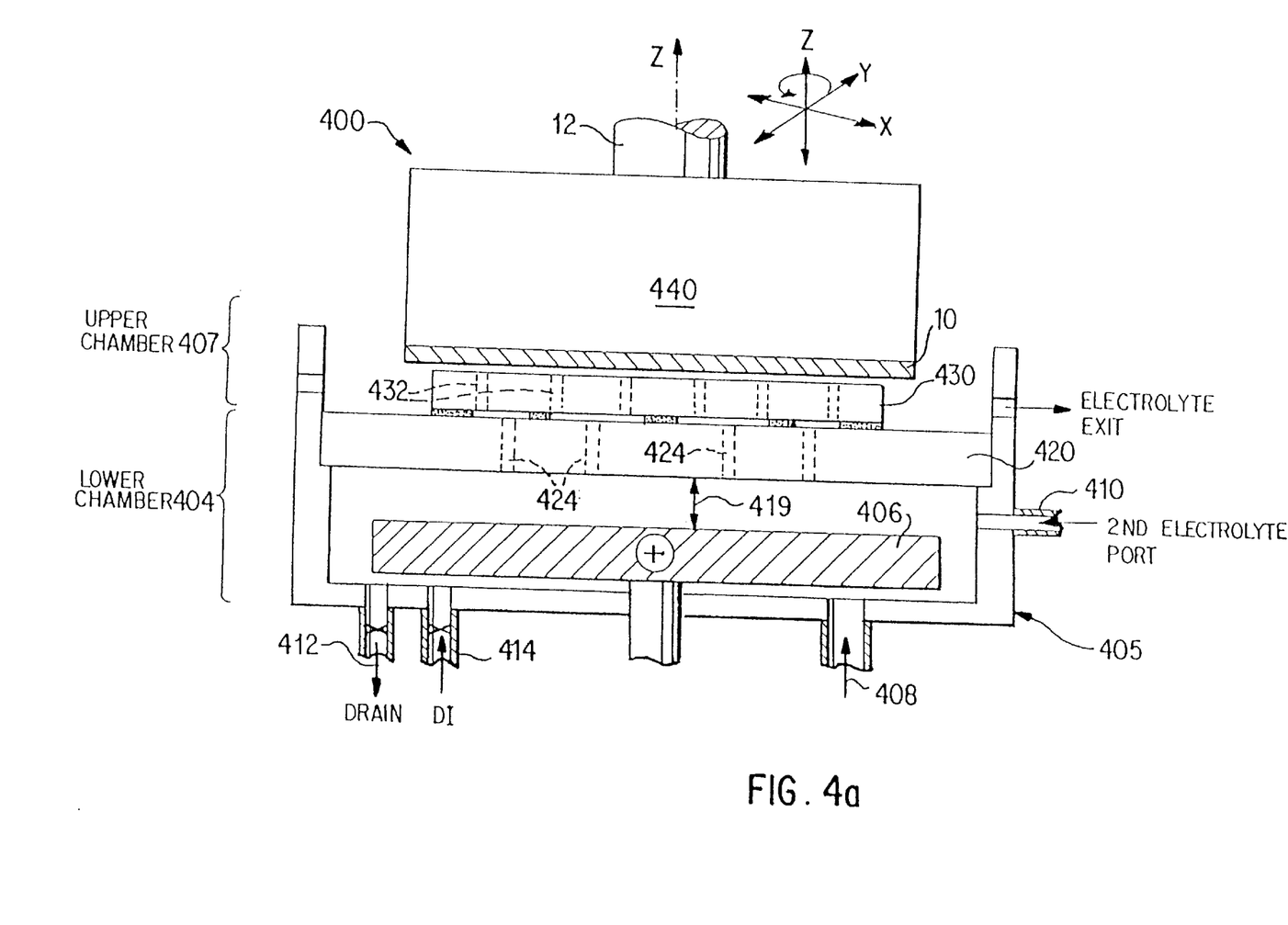
FIG. 4a illustrates a second example of an overall apparatus which could be modified to incorporate support member, pad, and fluid distribution structure according to the present invention.

Another example in which the improved support member, pad, and fluid distribution structure of the invention can be used is illustrated in FIG. 4a. Here, a chamber, generally indicated at 405, includes a lower chamber housing 404 and an upper chamber housing 407. Arranged in or on the lower chamber housing 404 are an anode 406, which may be soluble or insoluble, electrolyte inlets 408 and 410, and drains 412, 414. The anode 406 may be stationary or may rotate. For rotating anodes, a top surface of the anode 406 may include shaped impellers to enhance fluid transfer and communication between the lower chamber and the upper chamber. The lower chamber housing 404 may also contain an anode holder (such as holder 322b of FIG. 3a) with particulate filtering arrangements.

The entire chamber housing 404, 407 may be made of a polymeric material such as PVDF, or titanium, but preferably from stainless steel coated with a polymeric film such as PVDF, Teflon or other inert materials that do not adversely affect the performance of the electrolyte or deposited material.

The lower chamber is separated from the upper chamber by an electrolyte filled space or gap 419 (when the tool is operational). The electrolyte gap 419 may vary in size from about 0.5 to 30 mm, but preferably between about 1 to 20 mm. This electrolyte gap 419 may serve as a mixing zone for electrolytes before entering the pad support member 420. This is important in the deposition of laminate films, where metals of different composition are deposited. Thus, for example, one type of electrolyte may be injected via electrolyte inlet 408, while a second electrolyte may be injected intermittently or at a different flow rate into the electrolyte gap 419 from the electrolyte inlet 410. For example, one electrolyte may be injected at a flow rate of about 0.2 to 8 L/min through the electrolyte inlet 408, while a second fluid may be injected intermittently or continuously through electrolyte inlet 410 at a rate ranging from about 2 cc to 20000 cc/min. A portion of the electrolyte mixing may occur within the electrolyte gap 419. The balance of the mixing may occur within the pad support member 420, or within the pad material itself and in the area between the pad material 430 and the substrate 10.

Separating the lower chamber from the upper chamber is the pad support member 420 (shown as part of the lower chamber in FIG. 4). The pad support member 420 is essentially a plate with openings or channels 424 allowing the electric field and electrolyte fluid or fluids to communicate between the lower chamber and the upper chamber. The channels 424 in the pad support member 420 can be of any shape. If they are cylindrical, their diameter may range from about 0.5 to 5 mm, and the spacing between the various channel openings may range from about less than 1 to greater than 4 times their diameter, but preferably between about 1 and 4 times. Also, the channels themselves in the pad support member 420 may vary in diameter. The range of variation in diameter need not exceed 3 times that of the smallest channel opening. The pad support member 420 may be fabricated from a polymeric material, but preferably from titanium or stainless steel, a ceramic material, a high performance composite material, or some combination of the above materials. It is preferred than the pad support member 420 be coated with a very thin layer of Pt or palladium. The material preferably should not, however, degrade the performance of the electrolyte, degrade the deposited material on the substrate, or cause the pad material to react with the electrolyte.

Also, the pad support member 420 should be sufficiently stiff to minimize its deformation or deflection during material deposition and planarization pressures. In addition, the mount for the pad support member should be designed to minimize deformation or deflection of the pad support member 420. Thus, stiffeners (not shown) may be used as appropriate, on the lower surface of the pad support member 420 (surface facing the anode 406). The substrate holder 440 of FIG. 4a can move in the indicated x, y, and z directions, as well as rotate about the zaxis. The substrate holder 440 has the ability to control the pressure at which the substrate 10 is pushed against the pad 430.

The pad 430 is attached to the top surface of the pad support member 420 which faces the substrate 10. The pad material may contain fixed abrasives. The pad 430 has channels 432 of various shapes and forms. Their distribution on the pad 430 also varies depending on the functions to be carried out. In the present invention, the channels 432 in the pad 430 are designed to influence several important process parameters. These channels 432 determine the distribution of the electrolyte fluid or fluids over the surface of substrate 10. The channels 432 also shape the electric field between the anode 406 and the substrate 10. Proper choice of the pad material and the distribution of channel openings 432 on the pad 430, as well as the channels 424 in the pad support member 420 allow the inventive apparatus to be used for many different tasks. These include depositing super planar metal layers over a topological surface of the substrate, depositing a material in a conventional way but with better properties, removing material by wet etch or electro-etch, or planarizing an already deposited material.

The pad 430 may be attached to the pad support member 420 of FIG. 4a by a series of fine screws (not shown) that are recessed well into the pad material. Alternatively, the pad 430 may be attached to the pad support member 420 with a pressure sensitive adhesive (PSA). Regardless of the nature of the pad attachment, the materials used must be inert in the electrolyte and not degrade the electrolyte or the deposited material. The pad support member 420, which is disposed above the anode 406, be stationary; however, it may also be designed to vibrate or otherwise move with up/down, translational and/or rotational movements. It should also be noted that in FIG. 4, the pad support member 420 does not form a part of the anode, and is not selectively rendered anodic with respect to the substrate. It's potential may be allowed to float.

Again, it is to be understood that the support member electrolyte channel, distribution channel and pad electrolyte channel combinations according to the invention are designed to take the place of (a) the electrolyte channels 424 in the support member 420 of FIG. 4a, and (b) corresponding channels 432 provided for electrolyte fluid communication in the pad material 430 of FIG. 4a. Again, moreover, additional channels providing for predominately electric field communication may be included in the pad 330 of the invention.

Figure 4B:
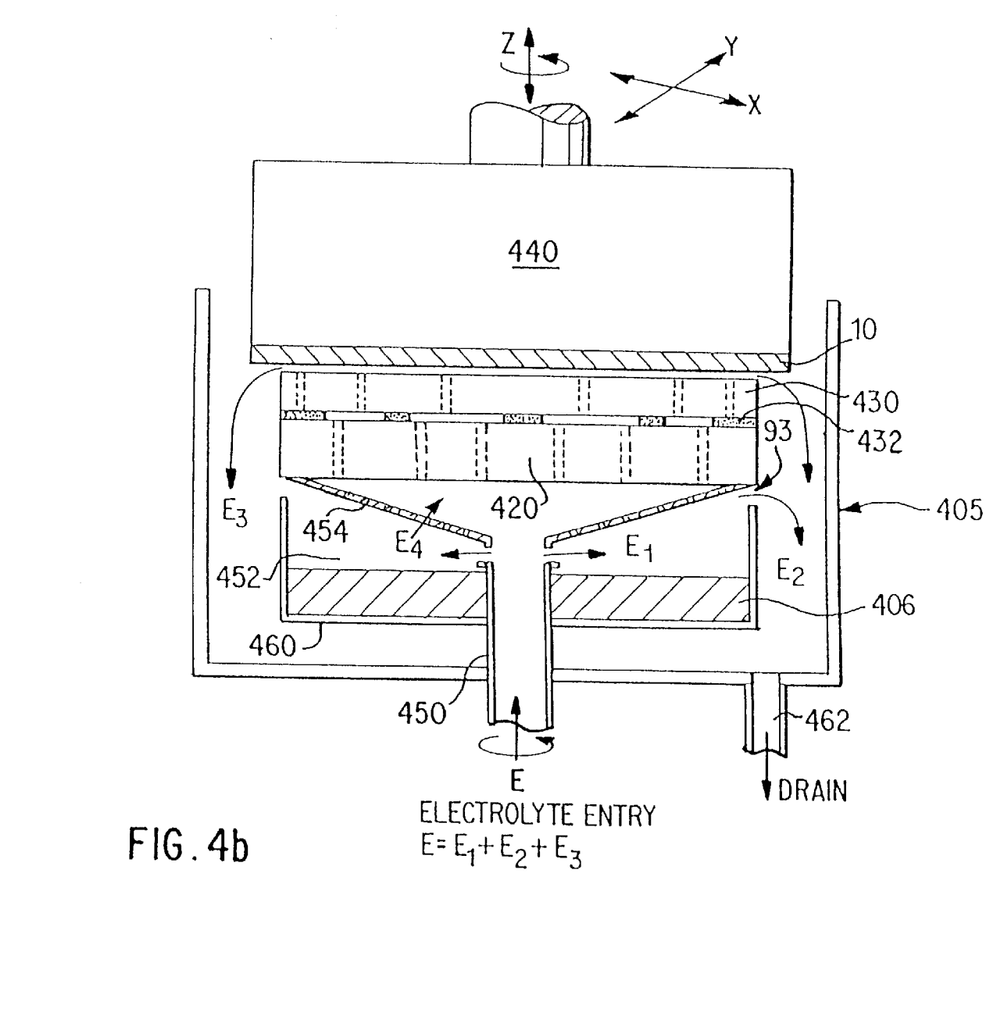
FIG. 4b illustrates a third example of an overall apparatus which could be modified to incorporate support member, pad, and fluid distribution structure according to the present invention.

A third example in which the structure of the invention can be used is illustrated in FIG. 4b. This example, likewise, includes a substrate holder 440 and substrate 10 as described earlier. The pad material 430 is arranged below the substrate 10 and is secured to the pad support member 420 via adhesive sheets 432. Like the pad material 430, the pad support member 420 also has its own fluid channels as described above. Electrolyte deposition solution E is fed into the pad support member 420 through a shaft 450 or other valving mechanism. Uniquely in this arrangement, the original flow volume of electrolyte E splits its flow into an anode compartment 452 (flow E1) and directly to the substrate. The portion that is fed to the anode compartment 452 (or the anolyte) is further split into two portions. A major portion of this solution flows through a filter 454 (flow E4) to the substrate by passing through the channels of the pad support member 420 and pad 430. The other minor portion E2 of the solution in the anode compartment 452 is allowed to leak out in a controlled manner at the uppermost corners of the anode chamber 452. This controlled fluid leak E2 allows air bubbles to escape and prevents their accumulation over the anode 406. It also allows for the selective loss of anode sludge material in the case of soluble anode materials like CuP, where thick anode sludge may affect metal deposit uniformity. Thus, in this arrangement, the volume of electrolyte E1 at any given time discharged into the anode chamber 452 is such that $$E1=E2+E4,$$

where E2 is the allowed controlled leakage volume to help purge bubbles and anode fines, and the balance E4 is the portion filtered through filter 454 and migrated to the substrate surface via the pad support member channels and pad channels.

Preferably, the amount of solution E2 allowed to leak ranges between about 0.1 to 20%, but preferably between about 1 to 10% of the total electrolyte flow E1. Also, it is preferred that the volume E4 of the electrolyte discharged into the anode chamber to minimize concentration polarization ranges between about 10 to 40%, but preferably between about 15 to 30% of the volume flow. Thus, the orifices in the shaft 450 discharging E1 into the anode chamber 452 may be chosen accordingly.

In FIG. 4b, the anode 406 resides or is secured in anode housing 460. A clearance gap 93 separates the anode housing 460 from portions of the pad support chamber adjacent to it. This clearance gap 93 is configured to allow for the controlled electrolyte leak E2 in this region as described earlier. Besides the clearance gap, tiny holes (not shown), typically less than 0.5 mm in diameter, may be drilled around the top of the anode housing 460 to supplement the clearance gap to manage the controlled leak. One or more large ports may also be secured to this region to control the leak solution volume E2.

The electrolyte E3 emanating from the substrate and the controlled leakage solution E2 may drain through a drain opening 462 at the bottom of the anode chamber 405. These solutions are typically drained to a reservoir for process filtering, and then recycled back to the deposition chamber. Also in FIG. 4b, as described earlier, the pad support member 420 may rotate. In this configuration, the anode housing 460 remains stationary. Electrolyte solution injected into the anode chamber 405 from a stationary or rotating pad support member causes excellent agitation of the electrolyte in the anode chamber 405. The rotation of the pad support member 420 may range from about 3 to 400 rpm, but preferably between about 5 to 300 rpm. It is again to be understood that the support member electrolyte channel, distribution channel and pad electrolyte channel combinations according to the invention are to take the place of (a) the electrolyte channels in the support member 420 of FIG. 4b, and (b) corresponding electrolyte channels in the pad material 430 in FIG. 4b. Once again, additional channels providing for predominantly electric field communication could be included in the pad.

Referring again to FIG. 4a, an example involving copper deposition will be described. A suitable copper plating solution is circulated from a reservoir through the lower chamber 404 from electrolyte inlet 408. The anode 406 may rotate to help the expulsion of flow of the electrolyte from the lower chamber 404 to the upper chamber 407 via the channels in the pad support member 422 and the channels in the pad material 430. Electrolyte flow may range between about 50 ml/min to about 12 L/min, but preferably between about 100 ml/min to 6 L/min depending on the size of the substrate 10. The larger the substrate size, the higher the flow rate. As the fluids emanate through and wetten the pad 430, the substrate 10 is lowered to rotate, glide or hydroplane on the surface of the wet pad 430.

The anode and cathode may be energized after a brief moment of wetting the substrate. The current density to the cathode may range between about 1 to 50 mA/cm$^2$, but preferably between about 5 to 45 mA/cm$^2$.

For example, the substrate may be plated at a current density of about 10 to 25 mA/cm$^2$ for 20 to 70% of the deposition time at a pressure of about 0 to 0.5 psi, and at a higher pressure for the 30 to 80% balance of the deposition time. The pressure on the substrate may increase from 0 to 0.5 psi mentioned above to 0.5 to 3 psi. The electrolyte flow may also be varied within the intervals. Also during the deposition, the carrier head may make continuous or intermittent contact with the stationary pad or rotating pad. The substrate and the anode may rotate between about 2 to 250 rpm, but preferably between about 5 to 200 rpm. Also, lateral movement of the substrate relative to the pad may occur during the deposition process. The speed of the lateral motion may ranges between about 0.5 to 25 mm/second.

The lateral motion is programmed such that the substrate, while rotating, comes to rest momentarily at various points, or during any stage of its motion. In addition, the rotation of the substrate may be varied in such a manner that, for instance, the substrate is rotated at only about 60 to 85% of normal when the substrate is at one end of a smaller anode/pad than when the centers of the substrate and anode coincide.

Figure 2C:
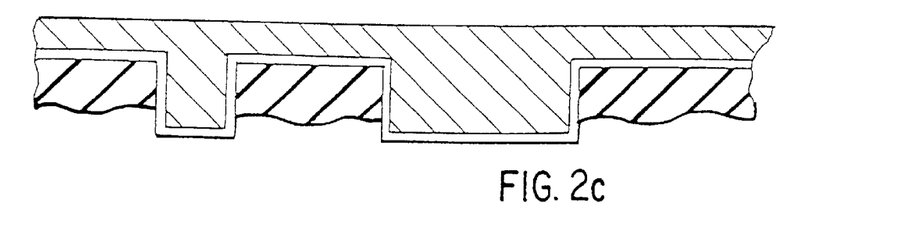
FIG. 2c is a partial cross-sectional view, similar to FIG. 1c, but showing a conductive layer having a uniform overburden across the substrate surface after deposition in a plating and polishing apparatus according to the invention.

Also, the pressure on the substrate is varied depending on the later position of the substrate relative to the pad. Thus, for a given pad design, the combination of various lateral motions, substrate rotation, substrate pressure and electrolyte flow rate may be used to control the uniformity of the deposited material. The deposited material may be either uniform or thinner at the edge or center of the substrate. Using the above process and an appropriate electrolyte, a superplanar metal deposit may be readily obtained when copper or any other metal is deposited over structures of the type shown in FIG. 1a. A resulting superplanar deposition structure is shown in FIG. 2c, in which the material overburden across the substrate is nearly independent of the width of the features on the substrate. This contrasts with deposited material structures from conventional metal deposition systems as shown in FIG. 1c.

The apparatus of FIGS. 4a and 4b can also be used for etching. Using a shaped pad in which only a small quadrant or rectangular area is accessible to the electrolyte and the electric field, the substrate may be electro-polished or electro-etched in a very controlled manner. The difficulty with electro-etching using a standard pad is that because electric current flows from the substrate's edge towards its center, the material removal rate is higher closer to the electrical contacts. Hence, by making the pad holes or channel openings arranged closer to the contacts smaller in diameter and fewer in number than those towards the center of the pad, the rate of metal removal by wet etch, electro-etching or polish may be rendered uniform from the center to the edge of the substrate, or may be dynamically controlled.

The apparatus allows for the deposition/removal of material on a substrate or workpiece surface while the surface is in static or dynamic contact with another surface. The other surface need not be the anode. The workpiece surface may be abrasive or non-abrasive in nature. It is essential, however, that the material of the other surface transmit fluid or electrolytes between an anode and a workpiece, as well as allow magnetic, electric or electromagnetic fields to communicate between the anode and the workpiece. In some portions, the pad contact material allows only the electric, magnetic or electromagnetic fields to communicate with the workpiece.

The pads 330 may include abrasive or non-abrasive materials. The pad thicknesses may range from about 0.2 to 20 mm, but preferably between about 0.4 to 10 mm. It is also desirable that the pads 330 be made of a material such as polyurethane, kevlar, glass fibers, ceramic fibers, polycarbonate, polyimide, elastomerized epoxy and PVDF, polysulfone or other suitable materials or material combinations.

One of the most important attributes of the pad material is that it does not degrade, contaminate or adversely affect the performance of the electrolyte solution. The pad material may be reinforced with hard abrasive particles. The abrasive particles may be titanium nitride, silicon carbide, cubic boron nitride, alumina, zirconia, diamond, ceria, hard ceramic powders, or hard metallic powders. Again, regardless of the type of abrasive particles used, the abrasive particles should not adversely affect the performance of the electrolyte solution, be dissolved by the electrolyte solution, or degrade the electrical and mechanical properties of the deposited metal layer.

The size of the abrasive particles should be less than approximately 5000 nm, preferably between about 3 to 1000 nm, and most preferably between about 4 to 50 nm. The particle loading or volume fraction in the pad may range from about 5 to 75%, but most preferably range from about 5 to 60% for optimum performance.

The abrasive content of the pad material may be varied radially from the center of the pad to the edge of the pad. For example, particle loading may be about 30–40% in the center and in regions around the center of the pad, and may be gradually reduced to about 5 to 15% at the periphery of the pad material. This gradation in particle distribution within the pad promotes uniform material removal across the pad, such that material removal by the pad is almost independent of the location of the pad. By way of example, for a nominal pad rotating at 100 rpm, the removal rate is expected to be lowest at the center of the rotating polishing pad, while it may be highest close to the periphery of the pad where the pad velocity with respect to the substrate is highest. Similarly, high abrasive loading in the pad material is expected to produce a higher material removal rate. Thus, the abrasive loading in a pad may vary so as to effect equivalent removal rates radially across the pad material despite the velocity differences.

Figure 4C:
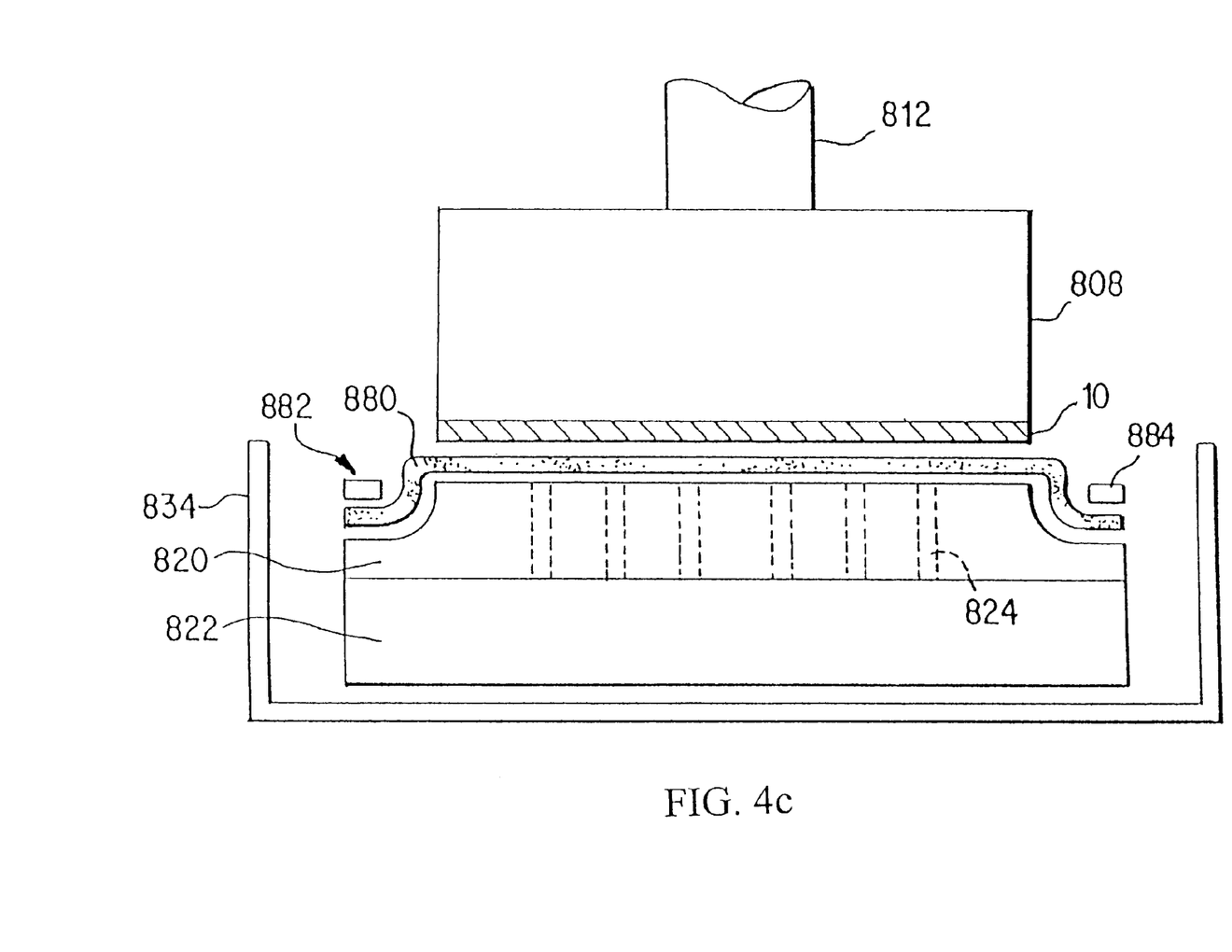
FIG. 4c illustrates a fourth example of an apparatus which could be modified to incorporate support member, pad, and fluid distribution structure according to the present invention.

A fourth example in which the structure of the invention can be used is shown in FIG. 4*c*. Here, the plating and polishing pad 880 is shaped so as to be attached to the top anode portion (pad support member) 820 at its flanges 882 via a suitable arrangement such as a ring 884. Yet again, it is to be understood that the support member electrolyte channel, distribution channel and pad electrolyte channel combinations according to the invention are designed to take the place of (a) the electrolyte channels in the pad support member 820 of FIG. 4*c*, and (b) corresponding channels provided for electrolyte fluid communication in the pad 880 of FIG. 4*c*. Additional channels providing for predominately electric fluid communication may be included in the pad 330 of the invention in this construction as well.

As discussed earlier, the apparatus using a shaped pad can perform electro-etching or workpiece surface modification. During electro-etching applications, the substrate is at a more positive potential than the anode. It is essential that the electrolyte and the electric field communicate to the substrate through the channels/holes/openings/slits, etc. in the pad material. During the etching removal process, either the anode carrying the pad or the substrate may be stationary, while the other component, disposed in close proximity, may rotate. The rotation of the substrate depends on the current density applied thereto. Thus, the material of interest may be completely removed in ½ to one full rotation of the substrate. At lower current densities, several rotations of the substrate around the anode may be needed. Also, only portions of the material on the substrate may be removed. In some applications the substrate may come into contact with the pad during the process operation. The combination of the electrolyte and mechanical work of the pad on the substrate may be used to modify the surface of the substrate.

Returning to the material removal or deposition process, openings in a non-porous pad allow electric field distribution only through the openings. As the substrate or the pad is slowly rotated, the openings sweep over the substrate surface to be processed. The regions or portions of the substrate directly across from the openings in the pad are therefore plated in the case of deposition, etched in the case of substrate electro-removal (etch or polish), or just oxidized and then dissolved in the electrolyte with or without the mechanical actions of the pad. The openings can have various shapes. However, for uniform material removal or deposition/surface modifications, it is important that the pad and/or the substrate be rotated, such that all portions of the substrate surface are exposed to the electric field for some period of time.

In certain preferred embodiments of the invention, the channel openings (orifices or perforations) 324*aa* in the pad support member 320 (anode portion) and the orifices 330*aa* in the pad material 330 can be of different dimensions.

The surface of the pad support member 320 (anode portion) arranged between the pad support member 320 and the pad material 330 may be used to control the uniformity of the metal deposited on the substrate. Depending on the shaping of the channel openings in the pad material and the pad support member, the pad material may serve as both an anode and cathode shield. This is because it is in contact with both the anode and cathode simultaneously during material processing. The shield may selectively filter the electrolyte fluid, the electric field or the magnetic field in different proportions. This selective filtration of the deposition parameters is used to control the uniformity of the deposited/removed material, as well as the mechanical, electrical and magnetic properties of the process with respect to the surface of the material or substrate. Also, the net amount of material deposited on the substrate or removed from the substrate is further enhanced by the presence of abrasive material in the pad material, especially in the surface of the pad material.

In a preferred embodiment, portions of the pad material in contact with the substrate act as insulators; however, in other embodiments, ferroelectric or magnetic materials may be incorporated or laminated within the pad material. The incorporation of a magnetic material within the pad material may be used to filter or shield magnetic field communications through the material during the deposition of a magnetic film on the workpiece.

Besides using circular or cylindrical channels or orifices in the various components, other geometries or combinations of geometries may be used. The openings in the pad material, moreover, can be used to control local uniformity. FIG. 3*e*, for example, is a top view of the pad in which more pad holes 330*aa* are used near the edge of the pad material to increase the thickness of the material deposited at and/or near the edge of the substrate.

In certain material removal applications, it is often preferred that the material removal process proceed from at or near the center of the workpiece and decrease outwardly towards the periphery. In this case, it is especially advantageous that a larger number of channels in the pad material be arranged at or close to the center of the pad material. In this case, fewer, or smaller, holes in the pad material reside close to the periphery of the pad material. Also, the diameter or size of the holes may be graded, such that the diameter decreases from the center of the pad towards the edge or periphery of the pad.

In yet another embodiment, the diameter or size of the pad material or the pad support member (or even the anode) may be smaller than the size of the substrate. For example, the diameter of the pad may be about 40% to 70% of the substrate. During material deposition, in the case when the anode and pad is preferentially arranged to one side of the chamber relative to the substrate, excessive material deposits may be observed on the portion of the substrate that continuously overlaps with the anode or pad material. This excess local deposit is a major source of deposit non-uniformity. This poor deposit uniformity is drastically reduced by shaping the pad material in such a manner that fewer and smaller holes or perforations are fabricated around the center of the pad, especially in the region of continuous overlap between the pad and the substrate. Large perforations may be fabricated away from the region of overlap and towards the periphery of the pad.

The above-described channel or perforation distribution selectively enhances more electrolyte and electric field communication towards the larger openings in the pad, thus increasing metal deposition to this region.

It is also to be noted that terms such as "above", "below", "top", and "bottom" as used through out the specification and claims are simply relative terms and are not intended to limit the device to any particular orientation. Although the drawing figures show the substrate holder 308 as disposed vertically above the pad 330 and the pad support member 320, this orientation could be modified so that the substrate holder is below the pad and pad support member. Moreover, the substrate holder, pad and pad support member assembly could be used in non-vertical orientations.

In the previous descriptions, numerous specific details are set forth, such as specific materials, structures, chemicals, processes, etc., in order to provide a thorough understanding of the present invention. However, as one having ordinary skill in the art recognizes, the present invention can be practiced without resorting to the details or specific embodiments set forth.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An apparatus capable of assisting in controlling an electrolyte flow and distribution of an electric field, a magnetic field, or an electromagnetic field in order to process a substrate, comprising:

a support member having a top surface and a bottom surface, the support member containing at least one support member electrolyte channel, each support member electrolyte channel forming a passage between the top surface and the bottom surface and allowing the electrolyte to flow therethrough; and a pad attachable to the support member, the pad containing at least one set of pad electrolyte channels also allowing for electrolyte flow therethrough to the substrate;

wherein each support member electrolyte channel is connected to one set of pad electrolyte channels by fluid distribution structure.

2. The apparatus according to claim 1, wherein said at least one support member electrolyte channel is one of a plurality of support member electrolyte channels.

3. The apparatus according to claim 2, wherein said set of pad electrolyte channels is one of a plurality of sets of said pad electrolyte channels.

4. The apparatus according to claim 1, wherein said fluid distribution structure includes distribution channels interconnecting each support member electrolyte channel to said one set of pad electrolyte channels.

5. The apparatus according to claim 4, wherein the distribution channels are at least partly formed in said pad.

6. The apparatus according to claim 4, wherein the distribution channels include recessed channels defined in a surface of said pad facing a top surface of said support member.

7. The apparatus according to claim 4, wherein the distribution channels are at least partly formed in said support member.

8. The apparatus according to claim 1, and further comprising at least one element interposed between said support member and said pad in which said fluid distribution structure is defined.

9. The apparatus according to claim 8, wherein said element is a platen having channels defined therein.

10. The apparatus according to claim 9, wherein said channels defined in the platen interconnect each support member electrolyte channel to said one set of pad electrolyte channels.

11. The apparatus according to claim 8, wherein no support member electrolyte channel is aligned with any of said pad electrolyte channels.

12. The apparatus according to claim 1, wherein no support member electrolyte channel is aligned with any of said pad electrolyte channels.

13. The apparatus according to claim 4, wherein each of said distribution channels extends substantially horizontally between the at least one support member electrolyte channel and one pad electrolyte channel of said set of pad electrolyte channels.

14. The apparatus according to claim 10, wherein each of said distribution channels extends substantially horizontally between the at least one support member electrolyte channel and one pad electrolyte channel of said set of pad electrolyte channels.

15. A method of assisting in control of an electrolyte flow and distribution of an electric field, a magnetic field, or an electromagnetic field for processing a substrate comprising:

providing a support member with at least one support member electrolyte channel, each support member electrolyte channel forming a passage between a top surface and a bottom surface of said support member and allowing flow of the electrolyte therethrough;

providing a pad, which is attachable to the support member, with at least one set of pad electrolyte channels also allowing for electrolyte flow therethrough to the substrate; and interconnecting each support member electrolyte channel with one set of pad electrolyte channels.

16. The method according to claim 15, wherein interconnection of each support member electrolyte channel with said one set of pad electrolyte channels is performed by interposing an element including fluid distribution structure between said support member and said pad.

17. The method according to claim 15, wherein interconnection of each support member electrolyte channel with said one set of pad electrolyte channels is performed by fluid distribution structure provided between said support member and said pad.

18. The method according to claim 17, wherein said fluid distribution structure includes plural fluid distribution channels defined in at least one of said support member and said pad.

19. The method according to claim 18, wherein the plural fluid distribution channels are at least partly defined in said pad.

20. The method according to claim 15, wherein no support member electrolyte channel is aligned with any of said pad electrolyte channels.

21. The method according to claim 16, wherein no support member electrolyte channel is aligned with any of said pad electrolyte channels.

22. The method according to claim 18, wherein the plural fluid distribution channels are at least partly defined in said support member.

* * * * *